(12) United States Patent
Pinto et al.

(10) Patent No.: US 7,671,794 B2
(45) Date of Patent: Mar. 2, 2010

(54) ATTITUDE ESTIMATION USING INTENTIONAL TRANSLATION OF A GLOBAL NAVIGATION SATELLITE SYSTEM (GNSS) ANTENNA

(75) Inventors: Robert W. Pinto, Waltham, MA (US); James E. Kain, Santa Rosa Beach, FL (US)

(73) Assignee: Enpoint, LLC, Lincoln, MA (US)

( * ) Notice: Subject to any disclaimer, the term of this patent is extended or adjusted under 35 U.S.C. 154(b) by 4 days.

(21) Appl. No.: 12/156,628

(22) Filed: Jun. 2, 2008

(65) Prior Publication Data

US 2009/0295633 A1    Dec. 3, 2009

(51) Int. Cl.
    *G01S 5/02*    (2006.01)
(52) U.S. Cl. .............................. 342/357.11; 342/357.06
(58) Field of Classification Search ............ 342/357.06, 342/357.11, 357.15, 357.17; 701/213, 215
    See application file for complete search history.

(56) References Cited

U.S. PATENT DOCUMENTS

| | | | |
|---|---|---|---|
| 5,193,064 A | | 3/1993 | Maki |
| 5,347,286 A | * | 9/1994 | Babitch ........................ 342/359 |
| 5,430,654 A | | 7/1995 | Kyrtsos et al. |
| 5,446,465 A | | 8/1995 | Diefes et al. |
| 5,490,073 A | | 2/1996 | Kyrtsos |
| 5,534,875 A | | 7/1996 | Diefes et al. |
| 5,548,293 A | | 8/1996 | Cohen |
| 5,575,316 A | | 11/1996 | Polklas |
| 5,617,317 A | | 4/1997 | Ignagni |
| 5,672,872 A | | 9/1997 | Wu et al. |
| 5,809,457 A | | 9/1998 | Yee et al. |
| 5,899,945 A | | 5/1999 | Baylocq et al. |
| 5,917,448 A | | 6/1999 | Mickelson |
| 5,929,805 A | | 7/1999 | Tadros et al. |
| 6,005,514 A | | 12/1999 | Lightsey |

(Continued)

FOREIGN PATENT DOCUMENTS

JP    08 262123 A    11/1996

(Continued)

OTHER PUBLICATIONS

Buchler, R.J., et al., "Design and Test of a Synergistic Interferometric GPS-INS," Position Location and Navigation Symposium, *IEEE* (1006), pp. 612-619.

(Continued)

*Primary Examiner*—Dao L Phan
(74) *Attorney, Agent, or Firm*—Hamilton, Brook, Smith & Reynolds, P.C.

(57) ABSTRACT

A system determines three-dimensional attitude of a stationary or moving platform using signals from a Global Navigation Satellite System (GNSS) antenna that undergoes deliberate translation, which may be occasional. The system uses single GNSS receiver, a single GNSS antenna, and inertial acceleration and/or rotation rate sensors. In one implementation, the GNSS antenna and inertial sensing components are rigidly connected and mounted to a pallet that is intentionally translated along a track as needed. In a second implementation, the GNSS antenna is mounted to a pallet, and the inertial sensing components are fixed in position. To maximize effectiveness, the track is oriented along a geometrical direction of the platform that is predominantly in a lateral direction from the gravity vector. The system achieves three-dimensional attitude accuracy that rivals interferometric GNSS systems.

23 Claims, 4 Drawing Sheets

U.S. PATENT DOCUMENTS

| | | | |
|---|---|---|---|
| 6,088,653 | A | 7/2000 | Sheikh et al. |
| 6,101,430 | A | 8/2000 | Fuller et al. |
| 6,114,988 | A | 9/2000 | Schipper et al. |
| 6,233,507 | B1 | 5/2001 | May |
| 6,594,582 | B1 | 7/2003 | Quinn |
| 6,598,009 | B2 | 7/2003 | Yang |
| 6,718,264 | B2 | 4/2004 | Takahashi |
| 6,754,584 | B2 * | 6/2004 | Pinto et al. ............... 701/215 |
| 6,844,847 | B2 | 1/2005 | Gounon |
| 6,879,875 | B1 | 4/2005 | Hu et al. |
| 7,136,751 | B2 | 11/2006 | Pinto et al. |
| 2002/0169578 | A1 * | 11/2002 | Yang ........................ 702/152 |
| 2008/0133135 | A1 * | 6/2008 | DiEsposti et al. ......... 701/226 |

FOREIGN PATENT DOCUMENTS

| | | |
|---|---|---|
| WO | WO 98/12572 | 3/1998 |
| WO | WO 00/22452 | 4/2000 |

OTHER PUBLICATIONS

Ellis, J.F., et al., "Interferometric Attitude Determination with the Global Positioning System," *J. Guidance and Control*, 2(6):522-527 (1979).

Lloret, Polen, "Inertial and Total Station and GPS for High Productivity Surveying," IEEE Plans '90 Las Vegas, NV, pp. 338-346 (1990).

Sohne, W., et al., "Integrated INS/GPS System for High-Precision Navigation Applications," Position Location and Navigation Symposium, 1994, IEEE Las Vegas, NV, pp. 310-313.

Hayward, R.C., et al., "Inertially Aided GPS Based Attitude Heading Reference System (AHRS) for General Aviation Aircraft," Presented at ION GPS '97: proceedings of the $10^{th}$ International Technical Meeting of the Satellite Division of the Institute of Navigation: Sep. 16-19, 1997, Kansas City Convention Center, Kansas City, Missouri.

International Search Report, mailed on Jan. 29, 2003, International Application No. PCT/US2002/05825.

* cited by examiner

SAMPLE MOTION PROFILES

PROCESSING FLOW

ATTITUDE ESTIMATION USING INTENTIONAL TRANSLATION OF A GLOBAL NAVIGATION SATELLITE SYSTEM (GNSS) ANTENNA

BACKGROUND OF THE INVENTION

Moving platforms include either vehicles such as aircraft, ground vehicles, boats, and spacecraft, or equipment, such as directional antennas, cameras, or turrets, that can be mounted to vehicles and reoriented relative to the vehicle body. The platforms may be traveling at fast or slow speeds, may be maneuvering or non-maneuvering, and may be occasionally stationary relative to geodetic space for time periods of arbitrary lengths. These platforms require knowledge of their geodetic attitude in order, for example, to support safety or stability control systems, to point an antenna, camera, or other sensor boresight at a geodetically known target, to control their geodetic position or attitude movement, or to register the information sensed along the boresight onto a map projection with geodetic coordinates. For the examples, the sensor, camera, or antenna boresight is the centerline of some signal collection or signal transmission aperture.

Earth-rate sensing through gyrocompassing, interferometry using Global Navigation Satellite System (GNSS), such as Global Positioning System (GPS), and transfer alignment (TA) are possible implementation approaches for precision geodetic attitude measurement systems for moving platforms. Each technique is in widespread use with a broad range of specific implementation details, and each technique alone without specific system support has significant limitations for precision pointing.

Earth rate sensing requires the use of a gyroscope with accuracy much better than the earth's 15-deg/hr-rotation rate. The gyroscopes used for conventional Earth rate sensing requires the use of a gyroscope with accuracy much better than the earth's 15-deg/hr-rotation rate. The gyroscopes used for conventional gyrocompass systems have drift specifications of typically less than 0.1 deg/hr, although some poorer performing systems use gyroscopes with drift specifications of less than 1 deg/hr. Modern military gyroscopes, currently used on missiles, can achieve 1 deg/hr accuracy with prices of about $5000 in large quantities. For a 1 deg/hr tactical weapon grade gyroscope, the north seeking accuracy is about 4 deg and is not sufficiently accurate for high-speed data collection and data access applications.

GNSS interferometry measures GNSS carrier phase to GNSS satellites from multiple spaced antennas. Carrier phase differencing removes all common mode ionospheric corruption from the differenced signals. The remaining phase difference can be used to infer range to GNSS satellites to millimeter (mm) accuracy, if numerous system level error sources are mitigated. The measurement is corrupted by cable-induced phase differences, on-vehicle multipath phenomena, the variation over satellite look angles of the phase delay differences between 2 antennas, and whole-cycle GNSS wavelength ambiguity that is 19 cm for commercial GNSS. A method not based on interferometry is often used to get close to the correct attitude and reduce whole-cycle ambiguity. Commercial motion characterization systems that use GNSS interferometry are available, but impose installation difficulties by requiring multiple antennas dispersed over several square meters. Also, the lack of wide-bandwidth attitude memory prevents any accuracy enhancement through data averaging unless the system is perfectly stationary. For effective operation, GNSS Interferometry requires knowledge of the relative location and orientation of system components including each GNSS antenna and all inertial sensing devices.

Transfer alignment (TA) is the most widely used precision orientation measurement method for military applications, and generically applies to a host of commercial systems. Transfer alignment synergistically combines an Inertial Navigation System (INS) with single-antenna GNSS system to estimate position and attitude. The INS, traditionally used only in military applications and high-end aircraft, has an Inertial Measurement Unit (IMU), which is an internal instrument suite that generally provides calibrated and compensated measurements of three axes of acceleration and three axes of rotation rate measurement. Mathematical manipulation of the acceleration and rotation rate measurements provides the position, velocity, and attitude of the platform at a high bandwidth. However, the navigation solution will drift unless some external corrections are incorporated. For low cost inertial components, the drift will occur rapidly. GNSS external measurement is most often used for the INS corrections of the IMU measurements. For GNSS transfer alignment, INS-derived velocity and GNSS-derived velocity are differenced, and the time-history of the differences is then used to infer errors in assumed geodetic alignment of the INS axes.

SUMMARY OF THE INVENTION

The need to maintain persistent changing velocity to enable attitude measurement and the traditional high cost of an Inertial Navigation System (INS) make Transfer Alignment (TA) unsuitable for many commercial applications. An embodiment of the present invention deliberately introduces changes in Inertial Measurement Unit (IMU) body velocity to render attitude errors observable and permits use of transfer alignment techniques under all platform dynamics to achieve system-level performance objectives.

Embodiments of the present invention use a single Global Navigation Satellite System (GNSS) antenna and receiver in a standard configuration, with intentional motion applied to both the GNSS antenna and motion sensing devices in one embodiment or to the GNSS antenna alone in a further embodiment. In each case, the movement of the sensor collection is along a prescribed path that is fixed to the rigid structure of the moving platform. In addition, the movement of the sensor collection has a known attitude with respect to the rigid structure of the moving platform.

Accordingly, a GNSS Inertial solution employs lateral acceleration to determine complete three-axes attitude. The gravity vector offers a single acceleration direction, allowing the estimation of pitch and roll components of attitude, but a separate lateral acceleration nominally orthogonal to the direction of gravity is employed to enable yaw determination. A typical GNSS Inertial system for attitude determination assumes that there is sufficient motion from lateral acceleration induced by natural disturbances while moving. However, when motion conditions reduce below some threshold, or for stationary conditions, the attitude measurement is aided by other techniques. GNSS interferometry, magnetic sensing, and zero update (ZUPT) processing are examples of commonly used approaches. The quality of the achievable attitude solution is strongly dependent on the suitability of the aiding source. The diverse aiding methods deem these solutions unique to their individual applications and may prevent any cost leverage from the economy of scale of a more generalized solution.

An example solution disclosed herein uses a purposeful lateral motion within the vehicle body axes system. One example of this motion is a linear motion along the fore-aft axes of the vehicle or along the right-left lateral direction. Many other motions, including two-dimensional translations, are also possible. The deliberate motion may be repetitive or non-repetitive, continuous or non-continuous, and may be used as an aid to starting or as an aid to maintaining an accurate solution.

One example system includes a GNSS antenna, GNSS receiver, Inertial Measurement Unit (IMU), computational element and supporting electronics, and electromechanical mechanism that provides motion. While many options exist for the arrangement of system components, a common feature among many embodiments is management of the motion of the GNSS antenna and, optionally, the IMU. Other sensors, such as magnetometers, may be incorporated as needed to support application requirements.

In one example embodiment, the IMU and GNSS antenna components may be configured as a compact mechanical package so that there is no relative motion between the two components. The example embodiment moves the package along a prescribed path that may be a track system, rail system, or any other translation system affixed to the vehicle structure. A preferred axis of the IMU orthogonal axes set is aligned with the axis of linear motion. A common IMU reference frame has the x-axis forward, y-axis right, and z-axis down, although any other formulation is acceptable. For this implementation, if a fore-aft motion is selected, then the x-axis of the IMU is aligned with the fore-aft track. Similarly, if a right-left motion is selected, then the y-axis of the IMU is aligned with the right-left track. More general motion of the sensing components along one dimension, two dimensions, or three dimensions is also possible as long as the motion is prescribed in the vehicle axes system. For attitude measurement, motion imparted along a linear track does not need to be known or measured, as the standard implementation of the TA process provides the attitude of the IMU axes set and thus the attitude of the vehicle. For other dynamical quantities including position, velocity, and acceleration, some knowledge or measurement of the motion imparted to the translation system may be employed or required, depending on the accuracy requirements of the end user application. The detraction of this embodiment is that both sensors must be moved; however, since IMUs have become significantly reduced in size and weight, the detraction may be acceptable in many situations.

A further embodiment attaches only the GNSS antenna to the translation system, and the IMU is fixed in position relative to the translation system. Deliberate motion separates the GNSS and IMU components with deliberate motion only imparted to the GNSS antenna. The further embodiment permits very general motion tracks, although one-dimensional tracks are adequate and are most simply implemented. For the further embodiment, motion imparted to the translation system must be known or measured to permit estimation of platform attitude using IMU and GNSS measurements.

An example method solution for the preferred embodiments may include a standard Kalman filter that merges GNSS and IMU data. Many forms of the Kalman filter formulation are possible. The Kalman filter algorithm is well known to navigation specialists and is published in numerous textbooks and papers. This use of a standard IMU/GNSS algorithm is useful to allow the use of advances in integration of IMU and GNSS technologies with minimal modification.

An example method solution for the alternative implementation may also include a Kalman filter that merges GNSS and IMU data. The formulation of the Kalman filter may be different from the Kalman filter selected for the preferred embodiments, but may be constructed using similar principles.

A translation system provided to translate the IMU/GNSS components along a linear or non-linear track. The translation system may be a motorized pallet, pulley system, geared system, or any other mechanical, electrical, or magnetic system. For some embodiments, the exact timing of the motion may be generally known, and precise synchronization of the GNSS and IMU data collection is not required. For the further embodiments, the temporal location of the antenna must be precisely known and synchronized to the sampling of the IMU sensor data.

Purposeful motion provides lateral acceleration to enable yaw angle estimation. Because the integrated GNSS carrier phase over some time epoch can be measured to the order of 1-2 mm for even low cost GNSS receivers, observability of the yaw attitude is significantly improved even for small translational distances of 0.3 m or less.

A motion characterization system according to an embodiment of the present invention characterizes general motion of a rigid body. The system includes an antenna that is configured to be stimulated by navigation signals and a receiver coupled to the antenna that receives the navigation signals and produces measurements of the received navigation signals. The system further includes a translating device, configured to impart motion to the antenna relative to a rigid body, and motion sensing devices, coupled to the rigid body and configured to provide signals providing motion information. The system further includes a processor that is coupled to the receiver and motion sensing devices and that processes signals therefrom to provide motion or attitude estimates of the rigid body under arbitrary motion conditions.

The motion sensing devices may be coupled to the rigid body via the translation device, and the antenna and motion sensing devices thus experience the same motion. The translating device may be configured to provide knowledge or measurement of motion imparted to the antenna and motion sensing devices, and the processor may use the knowledge or measurement to provide the motion or attitude estimates with improved accuracy relative to not using the knowledge or measurement.

The motion sensing devices may be mounted to the rigid body independent from the translating device. The translating device may be configured to provide knowledge or measurement of motion imparted to the antenna, and the processor may use the knowledge or measurement to provide the motion or attitude estimates with improved accuracy relative to not using the knowledge or measurement.

The processor may further be configured to cause the translating devices to impart motion to the antenna, in which case the processor may be configured to cause the translating device to impart motion to the antenna to improve accuracy of the motion or attitude estimates relative to not imparting motion to the antenna.

The translating device may impart a motion to the antenna along a linear path with respect to the rigid body. Alternatively, the translating device may impart a motion to the antenna along a general prescribed path relative to the rigid body.

The arbitrary motion conditions may include general moving motions, constant velocity motions, and stationary motions. In one application, the navigation signals are Global Navigation Satellite System (GNSS) signals.

It should be understood that a method for characterizing general motion of a rigid body might be performed in a manner corresponding to the foregoing example system embodiment.

Figure 1:
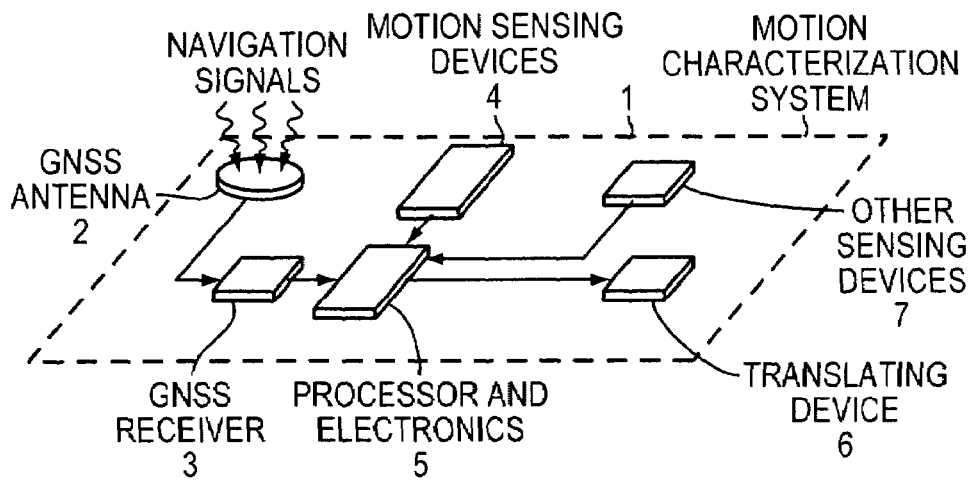
FIG. 1 is a high-level block diagram of the measurement and processing components of an embodiment of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Mobile vehicle navigations systems, online maps and imagery, and broadband satellite communications from mobile platforms each contribute to the explosive growth in the demand for data. Many systems for data collection or data access can only operate with adequate knowledge of the three-dimensional attitude of the platform used for mounting the system. Both existing and emerging data collection and delivery systems place stringent requirements on antenna pointing accuracy for satellite communications and camera pointing accuracy for geospatial data collection, as examples. While user equipment for fixed gateways can use traditional approaches, user equipment for mobile vehicles, including air vehicles and ground vehicles, demands more innovative solutions.

Example embodiments of the present invention facilitate data collection and high-speed data access by providing improved attitude estimation performance at lower overall system cost. The example embodiments permit use of relatively poor performing, low-cost motion sensing devices in a Global Navigation Satellite System (GNSS)/Inertial framework to enable accurate, affordable solutions.

Many high-speed data collection and data access applications must operate over dynamics ranging from stationary or near stationary to rapidly moving. Under stationary or near-stationary dynamics, the application platform may witness no acceleration to only small acceleration. Typically under these circumstances, transfer alignment (TA) approaches to attitude measurement are unsuitable, as transfer alignment needs persistent changing velocity to enable attitude measurement. Embodiments of the present invention deliberately introduce changes in velocity to render attitude errors observable when using transfer alignment techniques.

Transfer alignment uses a mathematics model where attitude errors propagate into the IMU-derived platform position and velocity in geodetic coordinates. By independently measuring the geodetic position and velocity with the GNSS navigation solution, the attitude errors are observed and corrected. However, the attitude errors are observable through the velocity, such that a change in attitude produces a change in geodetic velocity. The presence of a specific force acting on the platform must be present to impart attitude observability. A specific force is almost always present in the vertical direction since a force must be imposed to maintain the platform from falling towards the center of the earth. Thus, attitude about axes orthogonal to the vertical direction, the platform roll and pitch angles, are readily observed for any platform not in a free-fall condition. However, a platform at a constant velocity in the horizontal plane has no attitude observability about the vertical direction, the platform yaw angle. For successful transfer alignment, the horizontal plane motion must be sensed by the GNSS carrier phase measurements from the navigation GNSS antenna. Because the integration of carrier phase measurements, after correction for system error sources, is accurate to millimeter (mm) levels, even for a low cost commercial GNSS receiver, only a slight platform motion is sufficient for some level of yaw attitude measurement. Embodiments of the present invention introduce sufficient motion to achieve accurate attitude estimates when using transfer alignment, with the ultimate performance of the system determined by accuracy of the motion sensing devices.

FIG. 1 is a schematic diagram of an embodiment of the motion characterization system 1 that uses the principles of the present invention. The motion characterization system 1 uses a single GNSS antenna 2 to receive navigation signals, a single GNSS receiver 3 to process the navigation signals, motion sensing devices 4 to provide translational acceleration and rotation rate information about body motion, at least one processor and associated electronics 5 to estimate the motion of the body for delivery to other applications, a translating device 6 for moving the GNSS antenna and possibly the IMU, and optionally other sensing devices 7 for additional aiding or backup sensing. The motion characterization system 1 is rigidly connected, either directly or indirectly, to a platform, such as a vehicle rooftop or airplane, whose angular attitude is being sensed. The GNSS antenna 2 may not be collocated with parts of the motion characterization system 1 depending on the application. Many variations in the physical relationships among the components of the motion characterization system 1 are permitted.

The navigation signals may be transmitted by any GNSS including GPS, GLONASS, Galileo, or other navigation systems, as available. GNSS systems, such as GPS, provide precision positioning at all earth locations. GPS however, does not provide attitude information, and the motion characterization system 1 determines both the orientation and change of orientation of the receiving platform by other techniques. The motion characterization system 1 measures attitude, as parameterized by roll, pitch, and yaw, under all motion conditions for the platform, including the difficult situation of no platform motion.

The GNSS receiver 3 uses signals from the GNSS antenna 2 to provide measurements of the relationship between the GPS antenna 2 and the GPS satellite constellation. Different receivers provide different types of measurements. Some receivers provide raw code and carrier phase measurements for application use and other receivers provide only position, velocity, and time as derived quantities. The processes executed on the processor 5 conform to the GNSS measurements available.

An Inertial Measurement Unit (IMU) is the generally accepted term describing the collection of motion sensing devices 4, where the collection of motion sensing devices may be compensated and calibrated for device biases, device scale factor errors, device axis misalignments, and other error sources. The preferred embodiment and further embodiments use an IMU. The motion sensing devices 4 may include gyroscopes and accelerometers. The motion sensing devices 4 constituting an IMU typically develop estimates of acceleration and rotation rates along 3 nominally orthogonal axes. The other sensing devices 7 may include magnetometers, tilt sensors, speed measurement devices, barometers, additional GNSS receivers, or other sensors. The preferred embodiment uses minimal number of motion sensing devices to achieve performance objectives, but can be extended to include additional motion sensing devices and other sensors to improve effectiveness or extend the number of simultaneously supported applications.

The processor 5 may be a general-purpose computer, digital signal processor (DSP), application specific integrated circuit (ASIC), or other computing device. The processor 5 uses measurements provided by the GNSS receiver 3, motion measurements provided by the motion sensing devices 4, and potentially measurements from other sensing devices 7. The processor may run any suitable GNSS-based attitude estimation application that offers the accuracy demanded by a specific application.

The translating device 6 moves the GNSS antenna or the IMU or both either on demand or continuously. The processor 5 may be responsible for controlling the function of the translating device 6.

Figure 2:
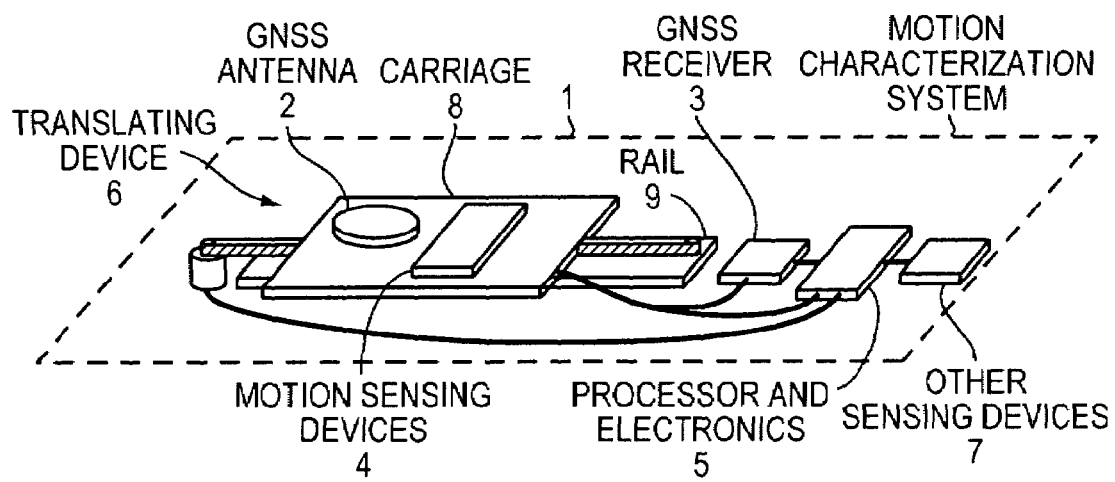
FIG. 2 is a schematic diagram depicting hardware arrangement of an embodiment with both Global Navigation Satellite System (GNSS) antenna and Inertial Measurement Unit (IMU) motion.

FIG. 2 shows the preferred embodiment that includes each of the components of the motion characterization system 1. The translating device 6 is diagrammatically shown to consist of a motor, a carriage, and a rail. The motion characterization system measures the attitude of a platform, and the rail is attached by some mechanism to the platform. The carriage moves relative to the rail using locomotion provided by the motor. Any other similar mechanical arrangement is suitable, as long as the carriage moves relative to the platform. Many translating techniques are applicable, including motors with leadscrews, motors with belts, and piezo linear motors, among others.

An example embodiment places the GNSS antenna and the motion sensing devices or IMU on the carriage, with the IMU axes mechanically aligned to the carriage. Both the GNSS antenna and the IMU witness the same motion relative to the platform. Traditional transfer alignment techniques that use GNSS measurements and IMU measurements result in estimates of the attitude of the IMU axes and, consequently, the carriage axes. If the carriage path is a linear path in body axes, then the carriage path also defines the platform attitude.

If the end-user application requires an estimate of platform position that is more precise than the path length, then the location of the carriage along the path must be known. If the end-user application requires an estimate of platform velocity, then the carriage velocity along the path must be removed from the carriage velocity measurement. Higher order dynamics such as platform acceleration are similarly treated. Estimates of carriage position relative to the platform can be gained either through calibrated control of the translating device 6 or through direct measurement of the relative motion. The GNSS receiver 3, processor and electronics 5, and other sensing devices 7 may be placed either on the carriage or on the rail without processing consequence.

Figure 3:
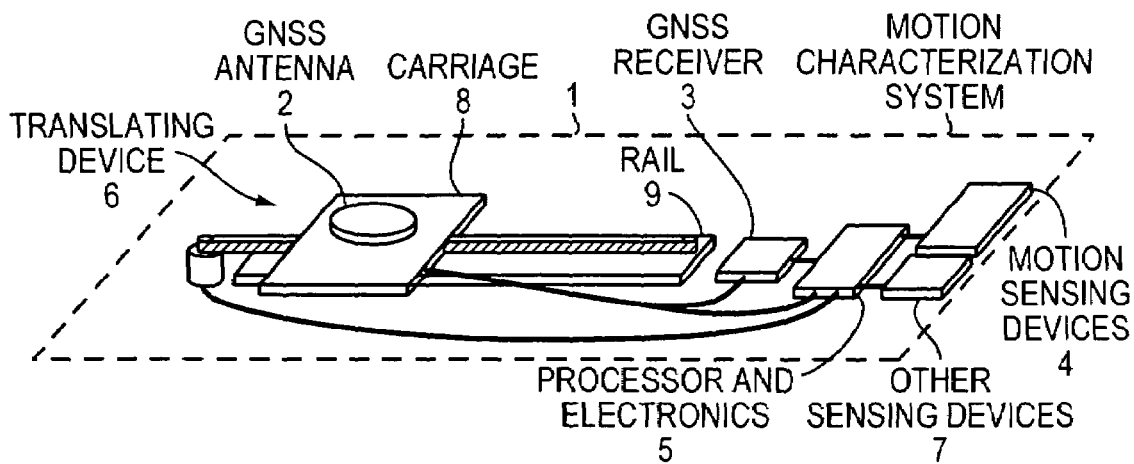
FIG. 3 is a schematic diagram depicting the essential hardware arrangement of a further embodiment with only GNSS antenna motion.

FIG. 3 shows a further embodiment that includes each of the components of the motion characterization system 1. The translating device 6 is diagrammatically shown to include a motor, a carriage, and a rail, and is constructed with the same generality as the device in the preferred embodiment.

The further embodiment place only the GNSS antenna 2 on the carriage, and the motion sensing devices 4 remain on the rail. To determine position, velocity, and attitude of the platform, estimation processing requires knowledge of the location of the GNSS antenna 2 relative to the location of the motion sensing devices 4. The knowledge can be gained either through calibrated control of the translating device 6 or through measurement of the relative motion. Since the GNSS antenna 2 and motion sensing devices 4 experience different motion, attitude estimation processing requires some straightforward modifications to traditional transfer alignment techniques. The GNSS receiver 3, processor and electronics 5, and other sensing devices 7 may be placed either on the carriage or on the rail without processing consequence.

The track followed by the carriage is nominally along an axis of the motion sensing devices 4. A significant portion of the net acceleration is nominally orthogonal to the gravity vector to promote maximum motion effectiveness as an attitude-aiding source. In general, the track can be along any trajectory in one dimension, two dimensions, or three dimensions. Only the capabilities of the translating device 6 limit the breadth of trajectories that can be used. For implementation simplicity only, the preferred embodiment and further embodiment use one-dimensional tracks. Circular tracks in two dimensions are straightforward to implement.

The acceleration along the track renders attitude errors visible, and the specific attributes of the acceleration profile affect attitude estimation accuracy. Selecting an acceleration profile depends on the capabilities of the translating system 6 to apply force, the need to extend reliability by limiting motion, the need to adaptively respond to processing systems estimate of attitude errors, and other factors. Both the preferred embodiment and the further embodiment may choose to control acceleration profiles to meet one or more system constraints and objectives.

Figure 4:
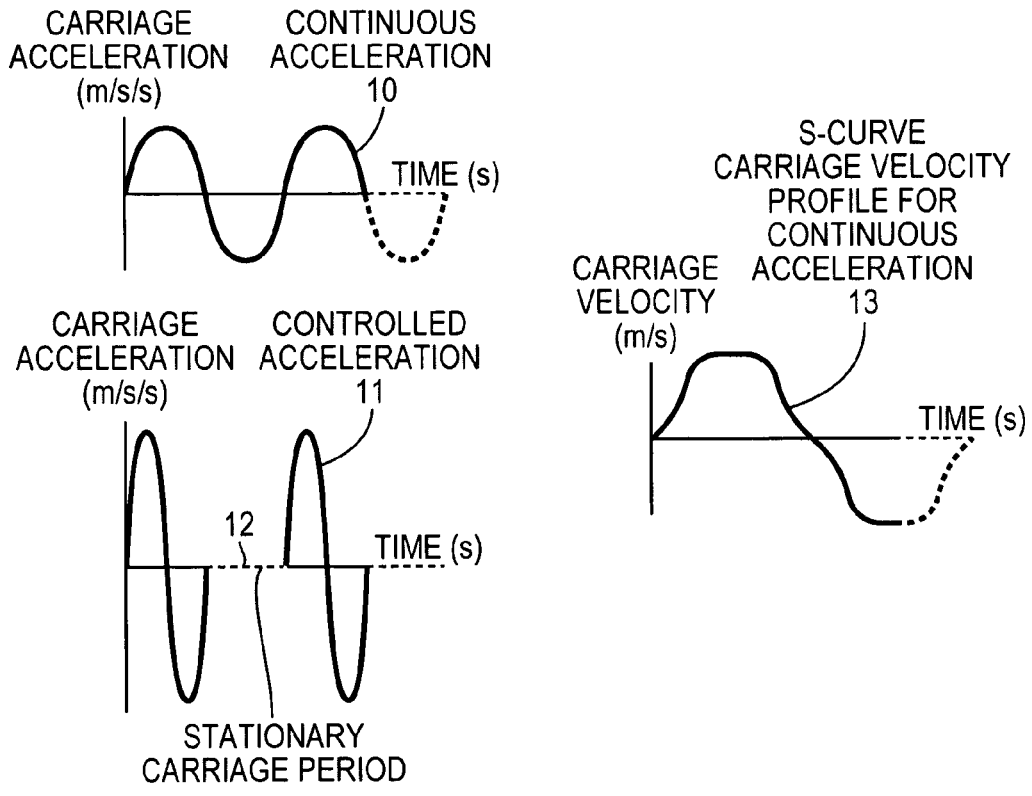
FIG. 4 is diagram showing sample acceleration and velocity profiles.

FIG. 4 includes some examples of acceleration profiles along a single dimension. The continuous acceleration profile 10 shows carriage acceleration repeating in time. Some continuous acceleration profiles may be algorithmic, such as sinusoidal, triangular, or parabolic. Other continuous acceleration profiles may be preferable depending on system estimation performance and operational constraints.

To maximize long-term reliability, other acceleration profiles may have quiet periods with no imparted acceleration and no velocity. FIG. 4 shows a sample controlled acceleration profiles 11, which has no acceleration for a fraction of the time. The controlled acceleration profile is selected so that the carriage 8 is stationary during the stationary carriage period 12. Stationary carriage periods reduce wear on any mechanical components, and properly selected stationary carriage periods have only a small affect on overall system performance. Very short duty cycles for active acceleration, 10% or smaller, may be suitable for various configuration options and performance requirements.

The translating device 6 has practical performance limitations, and is typically selected to minimize weight and cost. The force required to achieve a specific acceleration profile for the carriage 8 depends on the weight of the loaded carriage, and the cost of the translating device 6 generally depends on the maximum force required. In general, minimizing the maximum jerk, which is the derivative of acceleration, during the movement of the carriage 8 is useful for practical devices. FIG. 4 shows carriage shows the typical characteristics of an S-curve carriage velocity for continuous acceleration with minimal jerk. Both the preferred embodiment and a further embodiment use these principles in the design.

Figure 5:
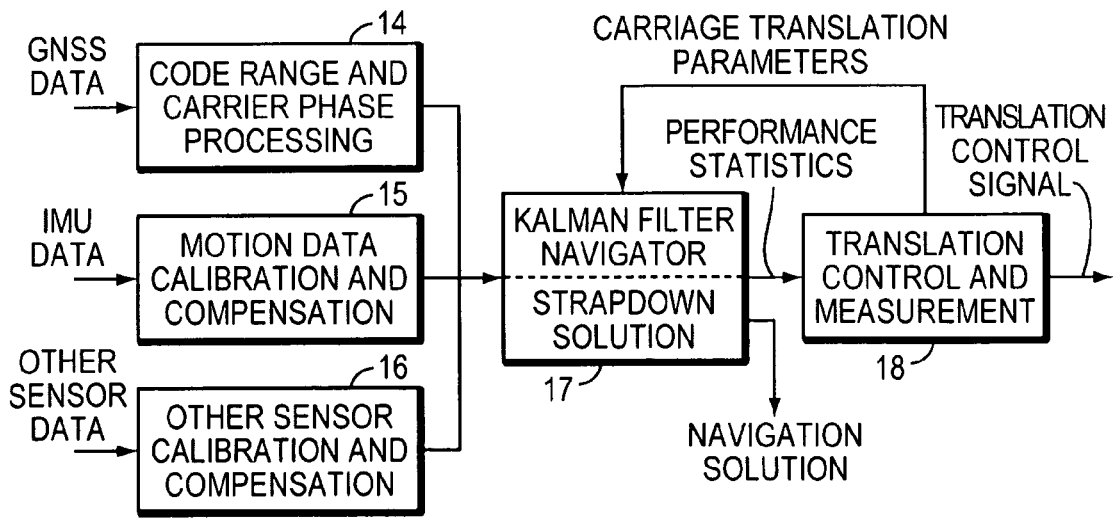
FIG. 5 is a functional diagram for a system using a processor for computations and shows connection to sensor measurements, the use of a Kalman filter navigator to provide a navigation solution complete with attitude, a translation control module for determining for controlling the translation of a carriage, and general input/output capabilities for communicating with an end user.

FIG. 5 is a functional diagram of the major processes executed in the processor and electronics 5. The GNSS measurement processing includes code range and carrier phase processing 14. Depending on the implementation, some of the processing may be executed by the Kalman filter used for navigation processing. Data from the motion sensing devices 4 is readied for use by motion data calibration and compensation 15. Data from other sensing devices 7 also undergoes device specific calibration and compensation. Further measurement processing requires measurement models, linearized measurement models, error models, and measurement and error propagation procedures used by subsequent processing.

A Kalman filter navigator 17 provides the estimation processing used to merge the IMU and GNSS measurements. Kalman filtering, which is well known in the art, requires a statistical mathematics model of the underlying system dynamics and the measurement processes. The accuracy of the Kalman filter results is dependent both on the accuracy of the underlying models and on the adherence of the models to the constraints imposed by the Kalman filter formulation. The Kalman filter navigator 31 and associated measurement processing use fundamental observables to infer system behavior. The motion characterization system 1 uses IMU measurements, selected GNSS signal observables, and a specifically formulated Kalman filter state model to estimate attitude. The strapdown solution results in a position, velocity, and attitude geodetic navigation solution.

All GNSS receivers 3 use pseudorandom noise (PRN) code sequences to synchronize the correlator channels for the tracked GNSS satellites. This correlation process provides a measure of the transit time of the signals from each GNSS satellite to the user, which contains an uncertainty due to the receiver oscillator forming the basis of the clock. Use of four GNSS satellites allows solution of the three-dimensional location of the user and the user clock error. The low rate digital message contains information about the calibration of the GNSS satellite clocks, precise orbital data for each acquired GNSS satellite, and the almanac containing less precise orbital data for all GNSS satellites.

The mechanization of the GNSS position solution is of little utility to the determination of attitude. Instead, the motion characterization system 1 uses Integrated Carrier Phase (ICP) as the basic GNSS observables for attitude measurement. Because the GNSS waveform is coherent, the GNSS receiver can lock to the phase of the GNSS satellite waveform and integrate phase changes to arrive at a precise measure of the change in received carrier phase over measured time intervals. As the GNSS satellite orbit is precisely known, the motion characterization system 1 can predict the contribution to phase change resulting from Doppler. The residual phase change is a measure of the average velocity of the GNSS receiver during the measurement interval, a GNSS epoch. The ICP is a noisy measurement, which contains errors due to the stability of the ionosphere and uncertainty in the GNSS satellite orbit. Many possible approaches exist for the use of ICP by the Kalman filter navigator 17.

The Kalman filter navigator 17 produces statistics that characterize navigation performance, including estimates of the accuracy of the attitude estimates. The motion control and measurement 18 can use the accuracy estimates to control the translating device 6 through a motion control signal. For example, when operating in stationary or near stationary dynamics, attitude estimation accuracy may slowly worsen at a rate dependent on quality of the motion sensing devices 4. If attitude accuracy has deteriorated to unacceptable levels, then the motion control and measurement 18 can choose to activate carriage motion until the accuracy statistics sufficiently improve.

Translation control and measurement 18 determines the position, velocity, and acceleration of the GNSS antenna 2 and motion sensing devices 4 relative to the rail 9. For some types of translation control such as stepping motors, measurement is implicit in the control, and little additional effort produces the carriage control parameters used to produce the navigation solution shown in FIG. 5. Other types of translation control require explicit measurement to yield the carriage motion parameters.

A simulation of an embodiment of the invention provides insight into the attainable performance when deliberate translation is used to augment the transfer alignment process. The simulation uses example dynamics for the carriage translation and incorporates error models for the GNSS and IMU measurements. A simplified error model for the GNSS/IMU formulation can be expressed as:

$$\delta\dot{v} = \delta\Theta \times f(t) + b_a + [f(t)]sfe_a + w_a \quad (1)$$

where $\delta v$ is the velocity vector error, $\delta\Theta$ is the attitude error vector small angle error, f(t) is the specific force vector as a function of time, $b_a$ is the accelerometer bias vector, $sfe_a$ is the accelerometer scale factor error vector, $w_a$ is the accelerometer noise vector, and $$\delta\dot{\theta} = b_g + [\omega_{b/i} \times]sfe_g + w_g \quad (2)$$

where $b_g$ is the gyroscope bias vector, $[\omega_{b/i} \times]$ is the small angle attitude matrix from inertial to body coordinates, $sfe_g$ is the gyroscope scale factor error vector, and $w_g$ is the gyroscope noise vector. Both the accelerometer bias vector and the gyroscope bias vector are assumed to be constant over the runtime of the simulation, although in practice the Kalman filter built for the this embodiment of the invention would typically use a first order Gauss-Markov model for the gyroscope and accelerometer bias statistics.

$$\dot{b}_a = 0 \quad (3)$$

$$\dot{b} = 0 \quad (4)$$

Finally, $$\delta\dot{v}_A = \delta\Theta \times f(t) + b_a + [f(t)]sfe_a + w_a \quad (5)$$

where $\delta v_A$ is the integrated velocity state representing the integration of carrier phase over the GNSS measurement interval. $\delta v_A$ is computed for a GPS receiver by processing the integrated carrier phase (ICP) for four or more satellites using the pseudoinverse matrix based on the unit vectors to the locked satellites. Setting $\delta v_A$ to zero after each GNSS measurement, while allowing the dynamic propagation of the integral between measurements, allows a simple means of describing the measurement of $\delta v_A$ for the Kalman filter measurement processing.

For the simulation of the embodiment of the invention, the state space model for the IMU/GNSS measurement problem is defined as $$\dot{\underline{x}} = F\underline{x} + \underline{w} \qquad (6)$$

where the state vector $\underline{x}$ is defined as $$\underline{x} = \begin{Bmatrix} \underline{\delta v} \\ \underline{\delta \theta} \\ \underline{b}_a \\ \underline{b}_g \\ \underline{sfe}_a \\ \underline{sfe}_g \\ \underline{\delta v}_A \end{Bmatrix} \qquad (7)$$

where the process matrix F is defined as $$F = \begin{bmatrix} 0 & -\underline{f}\times & I & 0 & [\underline{f}] & 0 & 0 \\ 0 & 0 & 0 & I & 0 & [\omega_{bli}\times] & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & -\underline{f}\times & I & 0 & [\underline{f}] & 0 & 0 \end{bmatrix} \qquad (8)$$

and where the process noise vector w is defined as $$\underline{w} = \begin{Bmatrix} \underline{w}_a \\ \underline{w}_g \\ 0 \\ 0 \\ 0 \\ 0 \\ \underline{w}_a \end{Bmatrix} \qquad (9)$$

The state vector covariance P is propagated as $$\dot{P} = FP + PF^T + Q \qquad (10)$$

where $$Q = \begin{bmatrix} Q_a & 0 & 0 & 0 & 0 & 0 & 0 \\ 0 & Q_g & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & Q_a \end{bmatrix} \qquad (11)$$

and where $Q_a$ is the noise strength of the accelerometer triad and $Q_g$ is the noise strength of the gyroscope triad.

For the simulation, the carriage 8 translates in an oscillatory motion oriented across the nominal fore-aft alignment of the motion sensing devices 7, where x denotes the fore-aft dimension, y denotes the lateral dimension, and z denotes the vertical dimension in a typical right-handed triad. Assuming that the lateral specific force is sinusoidal, then the specific force vector f(t) becomes $$\underline{f}(t) = \begin{bmatrix} 0 \\ r\left(\frac{2\pi}{T}\right)^2 \sin\frac{2\pi}{T}t \\ -g \end{bmatrix} \qquad (12)$$

where r denotes the lateral position extent of the motion, T denotes the period of the motion, and g denotes gravitational acceleration which is nominally 9.806 m/s/s.

For the simulation, the measurement matrix H is written as $$H = [0\ 0\ 0\ 0\ 0\ 0\ I] \qquad (13)$$

where the corresponding measurement covariance matrix R has representative values for the integrated carrier phase measurement error.

Table 1 includes the important parameters used to characterize the performance of the accelerometers and gyroscopes used as motion sensing devices 4. Bias, scale factor error (SFE), and random walk are key characterizations for each device. Table 1 includes representative parameter values for both a tactical grade IMU widely used in military weapon systems and a low-cost MEMS IMU used in commercial applications.

TABLE 1

Representative IMU Parameters

| Type | Gyro Bias (deg/hr) | Gyro SFE (ppm) | Angle Random Walk (deg/rt-hr) | Accel Bias (mg) | Accel SFE (ppm) | Velocity Random Walk (m/s/rt-hr) |
|---|---|---|---|---|---|---|
| Tactical Grade | 2 | 700 | 0.09 | 0.3 | 700 | 0.08 |
| Low-cost MEMS | 100 | 10000 | 4.20 | 10.0 | 20000 | 1.80 |

The covariance analysis simulation of the embodiment of the invention determines the expected performance of an attitude measurement system that uses intentional lateral motion to provide yaw observability under near stationary conditions. Sample results for both a tactical grade IMU and a MEMS IMU reflect the motion characteristics outlined in Table 2. Lateral travel of 15 cm (~6 inches) and 30 cm (~12 inches) are typical of practical systems with limited mounting requirements. Table 1 also displays the maximum acceleration experienced during sinusoidal motion with a period of 1 s, 2 s, 3 s, 5 s, or 10 s. Finally, Table 1 also shows the maximum mass in kilograms (kg) that is compatible with a translating device 6 capable of generating a force of 1 Newton (N). The mass of the GNSS antenna 2, the motions sensing devices 4 if present, and the carriage 8, must be less than the maximum mass for the system to function as designed.

TABLE 2

| | Simulation Parameters | | |
|---|---|---|---|
| Lateral Travel (m) | Period (s) | Maximum Acceleration (m/s/s) | Maximum Mass for 1N Force (kg) |
| 0.15 | 1 | 5.9 | 0.2 |
| | 2 | 1.5 | 0.7 |
| | 3 | 0.7 | 1.5 |
| | 5 | 0.2 | 4.2 |
| | 10 | 0.1 | 16.9 |
| 0.30 | 1 | 11.8 | 0.1 |
| | 2 | 3.0 | 0.3 |
| | 3 | 1.3 | 0.8 |
| | 5 | 0.5 | 2.1 |
| | 10 | 0.1 | 8.4 |

Figure 6:
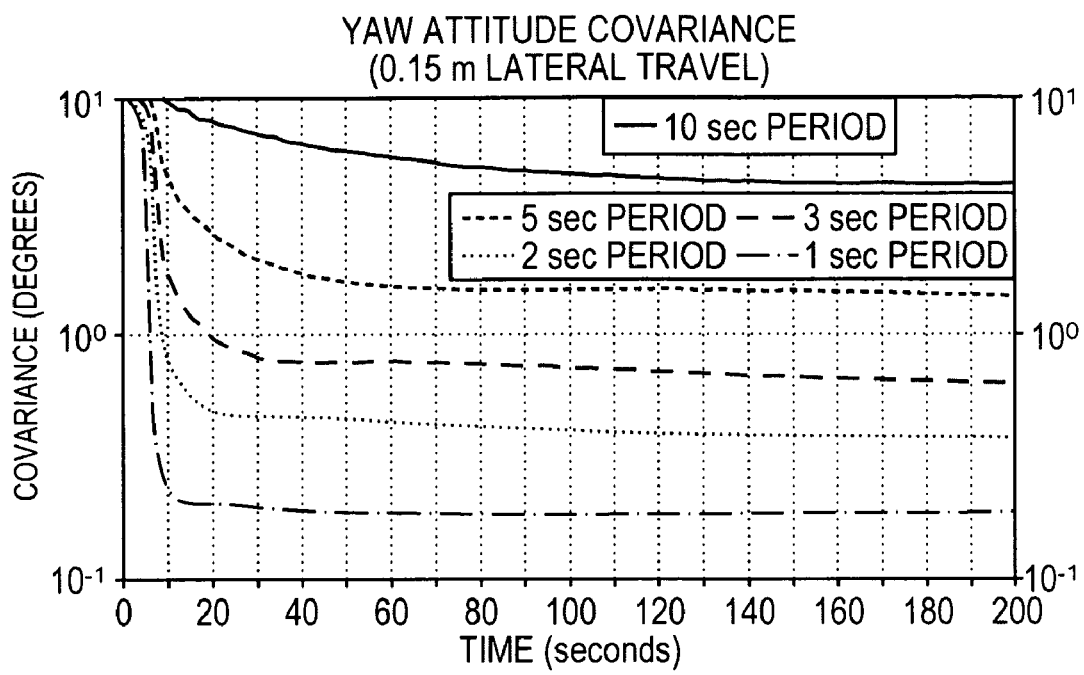
FIG. 6 is a plot produced by a system simulation for the attitude measurement system that is modeled in the block diagram of FIG. 1, showing results with a Micro Electrical Mechanical System (MEMS) IMU and a 150 mm track.

FIG. 6 shows predicted yaw measurement accuracy in degrees for a 0.15 m lateral translation when using a MEMS IMU. The individual results are parameterized by the period of the translation in seconds. For a 2 s period, the system achieves about 0.35 deg yaw attitude estimation accuracy. Reducing the period to is, the system achieves better than 0.2 deg in yaw attitude estimation accuracy. For this example, the selected MEMS IMU supports approximately 0.25 degrees in roll and pitch estimation accuracy; consequently, a system with 0.15 m lateral translation in a 1 s period has comparable accuracy for each attitude component.

Figure 7:
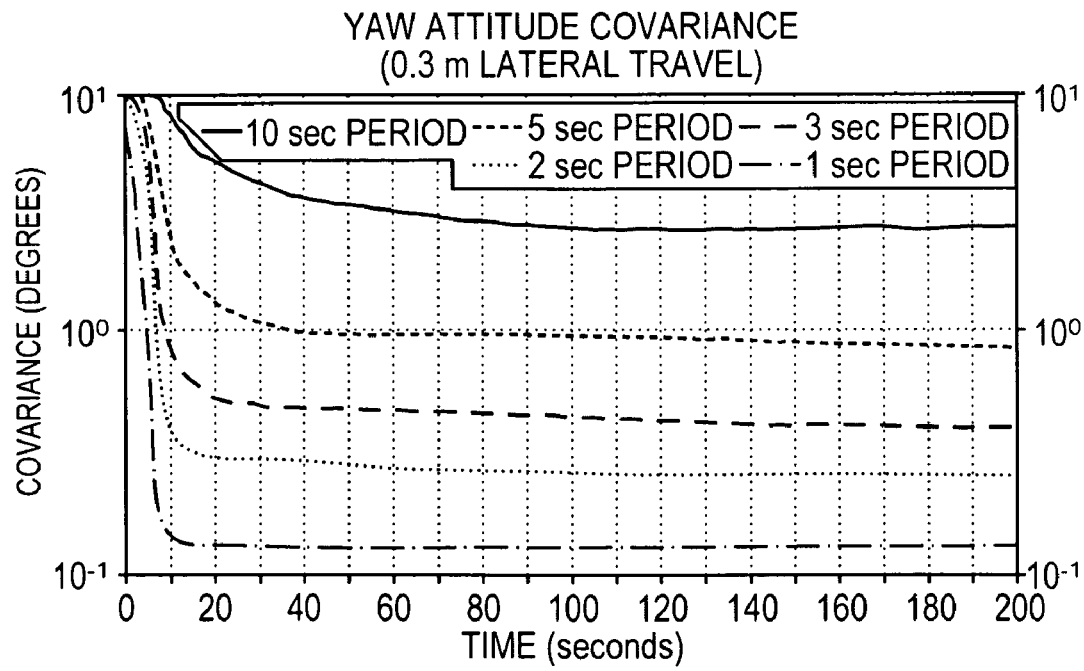
FIG. 7 is a plot produced by a system simulation for the attitude measurement system that is modeled in the block diagram of FIG. 1, showing results with a MEMS IMU and a 300 mm track.

FIG. 7 shows predicted yaw measurement accuracy in degrees for a 0.3 m lateral translation when using a MEMS IMU. A larger translation for a given period produces better yaw estimation accuracy. The simulation determines that a 0.3 m lateral translation with a 2 s period achieves about 0.25 deg yaw attitude estimation accuracy. Reducing the period to 1 s achieves better than 0.15 deg yaw attitude estimation accuracy. The results as expected are superior to the corresponding results for a system with 0.15 m lateral translation.

Figure 8:
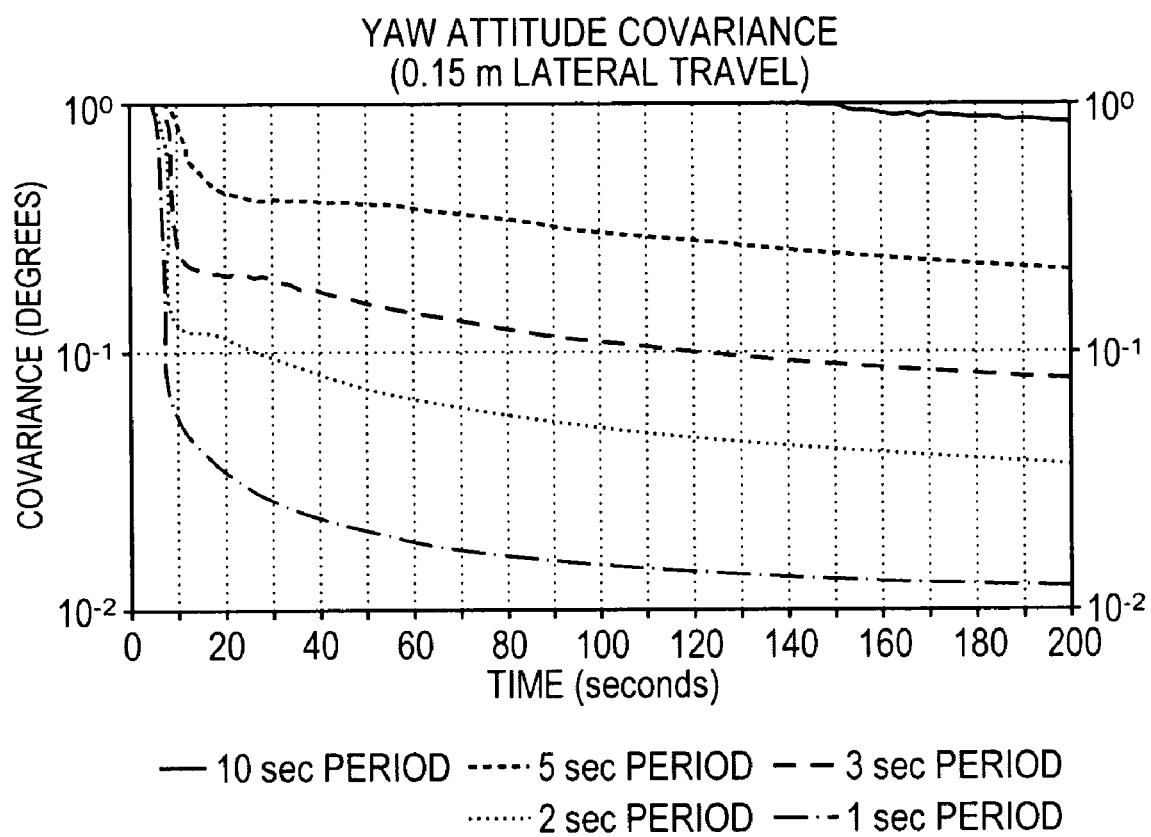
FIG. 8 is a plot produced by a system simulation for the attitude measurement system that is modeled in the block diagram of FIG. 1, showing results with a tactical grade IMU and a 150 mm track.

FIG. 8 shows predicted yaw measurement accuracy in degrees for a 0.15 m lateral translation when using a tactical grade IMU. For a 2 s period, the system achieves about 0.04 deg yaw attitude estimation accuracy, which is nearly an order of magnitude better than similar results for the MEMS IMU. Reducing the period to 1 s, the system achieves better than 0.015 deg in yaw attitude estimation accuracy.

While this invention has been particularly shown and described with references to preferred embodiments thereof, it will be understood by those skilled in the art that various changes in form and details may be made therein without departing from the scope of the invention encompassed by the appended claims.

What is claimed is:

1. A motion characterization system for characterizing general motion of a rigid body, the system comprising:

an antenna configured to be stimulated by navigation signals;

a receiver coupled to the antenna to receive the navigation signals and produce measurements of received navigation signals;

a translating device configured to impart motion to the antenna relative to a rigid body;

motion sensing devices coupled to the rigid body and configured to provide signals providing motion information; and a processor coupled to the receiver and motion sensing devices to process signals therefrom to provide motion or attitude estimates of the rigid body under arbitrary motion conditions.

2. The motion characterization according to claim 1 wherein the motion sensing devices are coupled to the rigid body via the translating device; and wherein the antenna and motion sensing devices experience the same motion.

3. The motion characterization system according to claim 2 wherein the translating device is configured to provide knowledge or measurement of motion imparted to the antenna and motion sensing devices; and wherein the processor uses the knowledge or measurement to provide the motion or attitude estimates with improved accuracy relative to not using the knowledge or measurement.

4. The motion characterization system according to claim 1 wherein the motion sensing devices are mounted to the rigid body independent from the translating device.

5. The motion characterization system according to claim 4 wherein the translating device is configured to provide knowledge or measurement of motion imparted to the antenna; and wherein the processor uses the knowledge or measurement to provide the motion or attitude estimates with improved accuracy relative to not using the knowledge or measurement.

6. The motion characterization system according to claim 1 wherein the processor is configured to cause the translating devices to impart motion to the antenna.

7. The motion characterization system according to claim 6 wherein the processor is configured to cause the translating device to impart motion to the antenna to improve accuracy of the motion or attitude estimates relative to not imparting motion to the antenna.

8. The motion characterization system according to claim 1 wherein the translating device imparts a motion to the antenna along a linear path with respect to the rigid body.

9. The motion characterization system according to claim 1 wherein the translating device imparts a motion to the antenna along a general prescribed path relative to the rigid body.

10. The motion characterization system according to claim 1 wherein the arbitrary motion conditions include general moving motions, constant velocity motions, and stationary motions.

11. The motion characterization system according to claim 1 wherein the navigation signals are Global Navigation Satellite System (GNSS) signals.

12. A method for characterizing general motion of a rigid body, the method comprising:

receiving navigation signals via an antenna to produce measurements of received navigation signals;

imparting motion to the antenna relative to a rigid body;

sensing motion of the rigid body and providing motion information of the rigid body; and processing the measurements of the received navigation signals and the motion information to provide motion or attitude estimates of the rigid body under arbitrary motion conditions.

13. The method according to claim 12 wherein sensing the motion of the rigid body includes sensing the motion imparted to the antenna.

14. The method according to claim 13 wherein imparting motion to the antenna includes providing knowledge or measurement of the motion imparted to the antenna and sensing the motion of the rigid body; and
wherein the processing uses the knowledge or measurement to provide the motion or attitude estimates with improved accuracy relative to not using the knowledge or measurement.

15. The method according to claim 12 wherein sensing the motion of the rigid body is substantially independent from sensing the motion imparted to the antenna.

16. The method according to claim 15 wherein imparting the motion includes providing knowledge or measurement information of motion imparted to the antenna; and
wherein the processing uses the knowledge or measurement to provide the motion or attitude estimates with improved accuracy relative to not using the knowledge or measurement.

17. The method according to claim 12 wherein the processing includes causing the imparting of motion to the antenna.

18. The method according to claim 17 wherein causing the imparting of motion to the antenna improves accuracy of the motion or attitude estimates relative to not imparting motion to the antenna.

19. The method according to claim 1 wherein imparting motion to the antenna includes imparting motion to the antenna along a linear path with respect to the rigid body.

20. The method according to claim 12 wherein imparting motion to the antenna includes imparting motion to the antenna along a general prescribed path relative to the rigid body.

21. The method according to claim 12 wherein the arbitrary motion conditions include general moving motions, constant velocity motions, and stationary motions.

22. The method according to claim 12 wherein the navigation signals are Global Navigation Satellite System (GNSS) signals.

23. A motion characterization system for characterizing general motion of a rigid body, the system comprising:
antenna means configured to be stimulated by navigation signals;
means for receiving the navigation signals to produce measurements of received navigation signals;
means for imparting motion to the antenna means relative to a rigid body;
means for sensing motion of the rigid body to provide signals providing motion information; and
means for processing the measurements of the received navigation signals and motion information to provide motion or attitude estimates of the rigid body under arbitrary motion conditions.

* * * * *